(12) United States Patent
Tamhankar et al.

(10) Patent No.: US 11,440,453 B2
(45) Date of Patent: Sep. 13, 2022

(54) VEHICLE HEAD RESTRAINT WITH TUNED DAMPER

(71) Applicant: Ford Global Technologies, LLC, Dearborn, MI (US)

(72) Inventors: Sangram Tamhankar, Canton, MI (US); Vishal Vinayak Nageshkar, Farmington Hills, MI (US); Chaitanya Nimmagadda, Ypsilanti, MI (US); Cindy Sofia Barrera-Martinez, Dearborn, MI (US); John Edward Huber, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/074,913

(22) Filed: Oct. 20, 2020

(65) Prior Publication Data

US 2022/0118898 A1 Apr. 21, 2022

(51) Int. Cl.
*B60N 2/879* (2018.01)

(52) U.S. Cl.
CPC .......... *B60N 2/879* (2018.02); *B60N 2205/20* (2013.01)

(58) Field of Classification Search
CPC .. B60N 2/879; B60N 2/888; B60N 2002/899; B60N 2205/20
See application file for complete search history.

(56) References Cited

U.S. PATENT DOCUMENTS

| | | | | |
|---|---|---|---|---|
| 8,833,859 | B2* | 9/2014 | Matsushima | B60N 2/818 |
| | | | | 297/391 |
| 9,387,784 | B2* | 7/2016 | Haga | B60N 2/806 |
| 9,452,697 | B2* | 9/2016 | Okubo | B60N 2/68 |
| 9,511,695 | B2* | 12/2016 | Okubo | B60N 2/806 |
| 9,981,586 | B2* | 5/2018 | Mizobata | B60N 2/80 |
| 9,981,587 | B2* | 5/2018 | Mizobata | B60N 2/80 |
| 10,150,394 | B2* | 12/2018 | Kobayashi | B60N 2/80 |
| 10,227,026 | B2* | 3/2019 | Takahashi | B60N 2/68 |
| 10,384,377 | B2* | 8/2019 | Mizobata | B60N 2/80 |
| 10,647,234 | B2 | 5/2020 | Okubo | |
| 2015/0251576 | A1* | 9/2015 | Ishimoto | B60N 2/4228 |
| | | | | 297/391 |

FOREIGN PATENT DOCUMENTS

| | | |
|---|---|---|
| JP | 5361321 | 9/2013 |
| JP | 2016130033 | 7/2016 |
| WO | 2015150437 | 10/2015 |

* cited by examiner

*Primary Examiner* — Philip F Gabler
(74) *Attorney, Agent, or Firm* — Vichit Chea; Carlson, Gaskey & Olds, P.C.

(57) ABSTRACT

An article, such as a vehicle seat, includes a one-piece vehicle head restraint structure that defines a frame and a plurality of receptacles. There are metallic resonators disposed in the receptacles. Polymeric dampers line the receptacles and circumscribe the metallic resonators.

18 Claims, 6 Drawing Sheets

VEHICLE HEAD RESTRAINT WITH TUNED DAMPER

TECHNICAL FIELD

This disclosure relates to vehicles and, more particularly, vehicle seat head restraints.

BACKGROUND

A seat, such as the passenger seat in an automobile, is a cantilevered structure. During automobile operation, vibrations may cause the seat to shake. In particular, the shaking may intensify at the resonant vibration frequency of the seat. In order to mitigate the shaking, a vibration damper is included in the head restraint of the seat. Such vibration dampers typically include a metallic mass supported by a rubber damper.

SUMMARY

An article according to an example of the present disclosure includes a one-piece vehicle head restraint structure that has a frame, a plurality of receptacles, and a plurality of metallic resonators. Each metallic resonator is disposed in one of the receptacles. Polymeric dampers line the receptacles and circumscribe the metallic resonators.

In a further embodiment of any of the foregoing embodiments, the plurality of receptacles includes at least first and second receptacles, and the first and second receptacles share a common receptacle wall.

In a further embodiment of any of the foregoing embodiments, the polymeric dampers define damper walls having a plurality of elongated cavities therein.

In a further embodiment of any of the foregoing embodiments, adjacent ones of the damper walls each have the elongated cavities, and the adjacent ones of the damper walls have unequal numbers of the elongated cavities.

In a further embodiment of any of the foregoing embodiments, adjacent ones of the damper walls each have the elongated cavities, and the elongated cavities are of unequal volumes.

In a further embodiment of any of the foregoing embodiments, the elongated cavities are of uniform cross-sectional areas.

In a further embodiment of any of the foregoing embodiments, the elongated cavities taper.

In a further embodiment of any of the foregoing embodiments, the polymeric dampers define damper walls having a plurality of through-holes therein.

In a further embodiment of any of the foregoing embodiments, adjacent ones of the damper walls each have the through-holes, and the adjacent ones of the damper walls have unequal numbers of the through-holes.

In a further embodiment of any of the foregoing embodiments, adjacent ones of the damper walls each have the through-holes, and the through-holes are of unequal size.

In a further embodiment of any of the foregoing embodiments, the through-holes are arranged in a column, and the through-holes in the column progressively decrease in size.

In a further embodiment of any of the foregoing embodiments, the polymer dampers are formed of rubber, and the metallic resonators are metallic blocks.

In a further embodiment of any of the foregoing embodiments, a damping response of the polymer dampers and the metallic resonators is tuned to a resonant vibrational frequency of a vehicle seat.

An article according to an example of the present disclosure includes a headrest that has a cushion, a one-piece vehicle head restraint structure that supports the headrest and has a frame, a plurality of receptacles, and a plurality of metallic resonators. Each metallic resonator is disposed in one of the receptacles. Polymeric dampers line the receptacles and circumscribe the metallic resonators.

In a further embodiment of any of the foregoing embodiments, the polymer dampers are formed of rubber, and the metallic resonators are metallic blocks, and a damping response of the polymer dampers and the metallic resonators is tuned to a resonant vibrational frequency of a vehicle seat.

In a further embodiment of any of the foregoing embodiments, the plurality of receptacles includes at least first and second receptacles. The first and second receptacles share a common receptacle wall, and the polymeric dampers define damper walls having at least one of a plurality of elongated cavities therein or a plurality of through-holes therein.

In a further embodiment of any of the foregoing embodiments, adjacent ones of the damper walls each have the elongated cavities, and the adjacent ones of the damper walls have unequal numbers of the elongated cavities or the elongated cavities are of unequal volumes.

In a further embodiment of any of the foregoing embodiments, adjacent ones of the damper walls each have the through-holes, and the adjacent ones of the damper walls have either unequal numbers of the through-holes or the through-holes are of unequal sizes.

An article according to an example of the present disclosure includes a one-piece vehicle head restraint structure that has a frame and at least first and second receptacles. The frame includes first and second ribbed trusses connected by a cross-beam and at least two elongated armatures extending from the first and second ribbed trusses. The first and second receptacles extend off of the cross-beam between the first and second ribbed trusses. The first and second receptacles share a common wall.

In a further embodiment of any of the foregoing embodiments, the one-piece vehicle hear restraint is formed of a polymeric material, and each said receptacle is defined by receptacle side walls, a receptacle bottom wall, and an open top.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
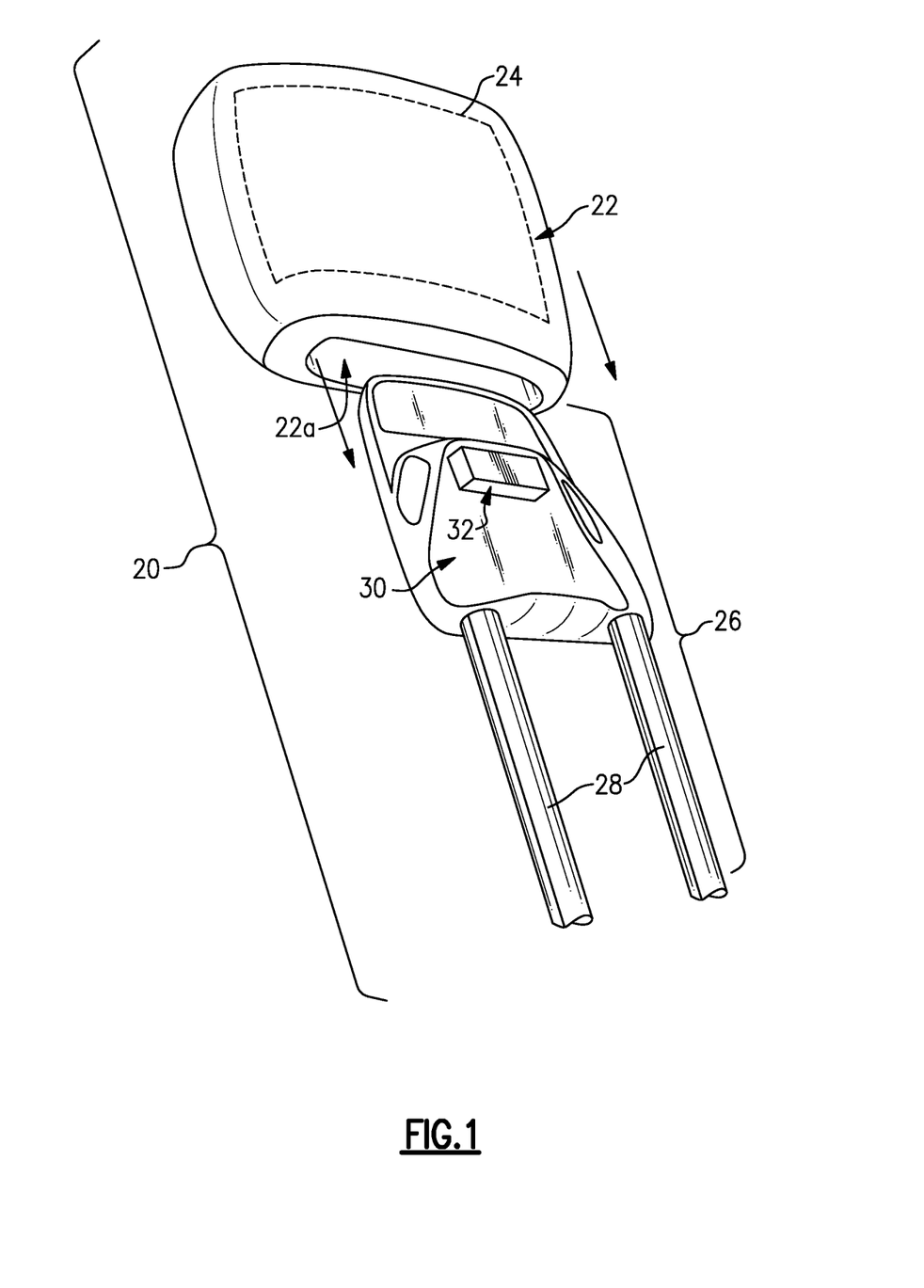
FIG. 1 illustrates portions of a vehicle seat.

FIG. 1 schematically illustrates an expanded view of selected portions of a vehicle seat 20. In particular, FIG. 1 shows an upper portion of the vehicle seat 20 that is near the head of an occupant when they are seated. The vehicle seat 20 may be used in an automobile but is not limited thereto and may be adapted for other types of vehicles.

The vehicle seat 20 includes a headrest 22 that has a cushion 24. The headrest 22 includes a slot 22a into which at least a portion of a head restraint structure 26 is received. In general, the head restraint structure 26 includes at least two armatures 28 that serve to mount the head restraint structure 26 on a remaining portion of the vehicle seat 22 (not shown) in a known manner. The armatures 28 extend from a truss structure 30. A vibration damper 32 (discussed in further detail below) is disposed in the truss structure 30.

The vehicle seat 20 is generally mounted in a cantilevered manner in a vehicle. During operation of the vehicle, vehicle vibrations can cause the vehicle seat 20 to vibrate. Such vibration occurs both in a forward/rearward direction and in a lateral direction (both relative to the front/back orientation of the vehicle). In particular, the vehicle seat 20 has one or more resonant vibration frequencies. Such resonant frequencies can be determined or estimated by experiment and/or computer simulation.

If the vehicle vibrates at or near the resonant frequency, the vibration of the vehicle seat 20 intensifies in terms of vibration magnitude (amplitude). In this regard, the vibration damper 32 is "tuned" to the resonant frequency of the vehicle seat 20 in order to facilitate mitigation of the intensified vibrational response of the seat 20. The term "tuned" is reference to the ability of the vibration damper 32 to reduce the amplitude of vibration at the resonant vibration frequency of the seat 20 in comparison to the amplitude of vibration without the vibration damper 32. As will be described below, the configuration of the vibration damper 32 may be modified in order to tune the damping response. For example, the vibration damper 32 reduces the amplitude of vibration (e.g., the normalized displacement) by at least 25%.

Figure 2:
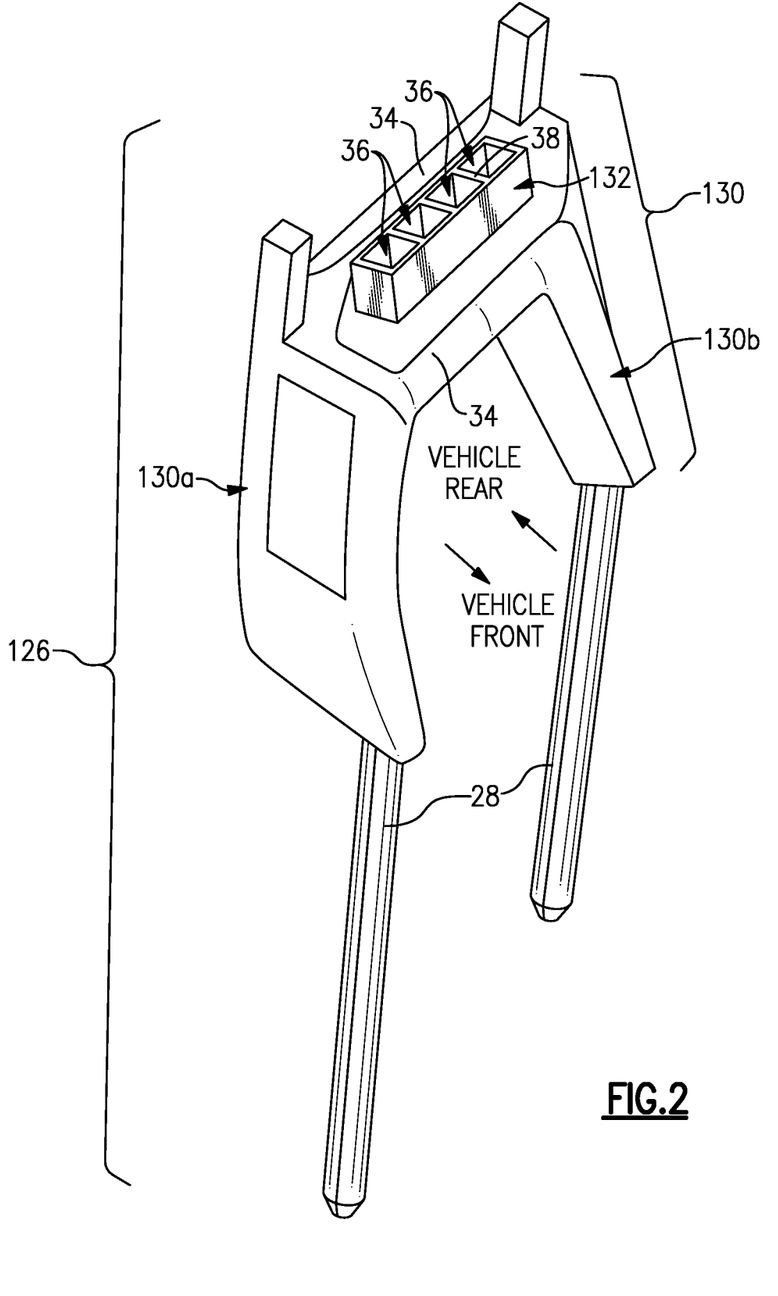
FIG. 2 illustrates an example head restraint structure.

FIG. 2 illustrates a further example of a head restraint structure 126 that may be used in the vehicle seat 20. In this disclosure, like reference numerals designate like elements where appropriate and reference numerals with the addition of one-hundred or multiples thereof designate modified elements that are understood to incorporate the same features and benefits of the corresponding elements unless otherwise indicated or implied. In this example, the armatures 28 extend from truss structure 130. The truss structure 130 includes first and second ribbed trusses 130a/130b that are connected by one or more cross-beams 34.

The vibration damper 132 is situated off of one of the cross-beams 34. As shown, the vibration damper 132 includes a plurality of receptacles 36 (four in the illustrated example) that are situated back-to-back. In this regard, adjacent receptacles 36 share common receptacle walls 38 there between.

Figure 3:
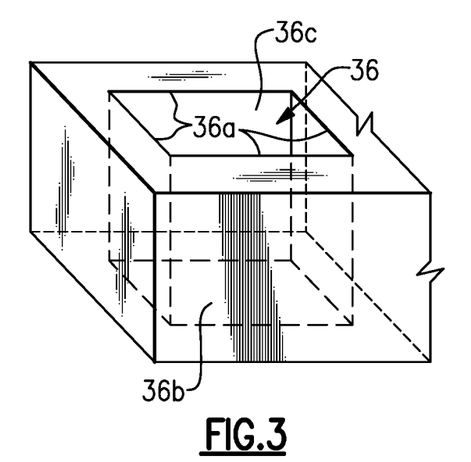
FIG. 3 illustrates a receptacle of a mass damper.

FIG. 3 shows a representative example of one of the receptacles 36. Each receptacle 36 is defined by receptacle side walls 36a, a receptacle bottom wall 36b, and an open top 36c. In this example, the receptacle 36 is cubic or rectangular, but it is to be understood that other polygonal or non-polygonal geometries may alternatively be used. The walls 36a/36b/36c are formed of a polymeric or metallic material, such as but not limited to, a thermoplastic polymer or aluminum alloy. For example, the entire head restraint structure 26/126, including the armatures 28, truss structure 30/130, and receptacles 36, are formed by additive manufacturing as a single piece. That is, the head restraint structure 26/126 does not have any mechanical or bonded joints. The additive manufacturing permits relatively complex geometries, facilitates a reduction in part numbers, and facilitates good stiffness and strength.

Figure 4:
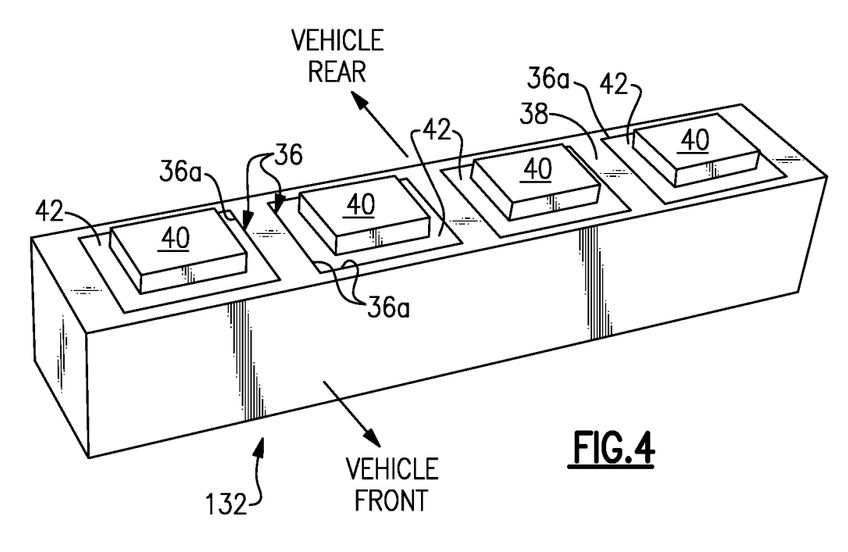
FIG. 4 illustrates a vibration damper.

FIG. 4 illustrates the vibration damper 132 with metallic resonators 40 and polymeric dampers 42. The metallic resonators 40 are disposed in the receptacles 36. The polymeric dampers 42 line the receptacles 36 and circumscribe the metallic resonators 40. in this regard, the metallic resonators 40 generally have the same type of geometry as the receptacles (e.g., cubic or rectangular) but are smaller than the receptacles 36 so as to fit into the receptacles 36. The polymeric dampers 42 are located in the annular space between the metallic resonators 40 and the receptacle side walls 36a.

The polymeric dampers 42 are formed of a resilient material, such as rubber. For example, the rubber is, but is not limited to, natural rubber (NR), synthetic isoprene rubber (IR), butadiene rubber (BR), or styrene-butadiene rubber (SBR). The rubber may include additives to modify the properties thereof, such as the spring constant of the material, the fatigue resistance, and the processability. Additives may include, but are not limited to, fillers, antioxidants, anti-ozonants, curatives, plasticizers, and vulcanizers.

During vehicle operation when the vehicle seat 20 vibrates, the metallic resonators 40 may vibrate in a forward/rearward direction and lateral direction. The metallic resonators 40 vibrate against the polymeric dampers 42. The dampers 42 thus repeatedly compress and recover (expand) as the resonators 40 vibrate. The compression and recovery serve to absorb the vibrational energy, which is dissipated as heat. As will be described in further examples below, the compression and recovery properties of the dampers 42 (i.e., spring properties) may be configured to modify the damping effect and thereby facilitate tuning of the vibration damper 132. That is, the examples below demonstrate manipulation of the mechanical design of the damper to modulate the spring constant. In addition, the spring constant of the rubber material may be manipulated through the rubber formulation.

The following non-limiting examples demonstrate various configurations for tuning the spring properties of the dampers. In general, the premise of the examples is that cavities or holes may be introduced into the dampers in order to change the spring constant in a desired direction. For example, the spring constant is tuned in the forward/rearward direction, lateral direction, or both to target resonant frequencies. Additionally, it is to be appreciated from this disclosure that the designs herein are readily adaptable to differing vehicle designs and resonant frequencies. For instance, different vehicle models may use the same or similar head restraint structures for seats that have different resonant frequencies. In this regard, the vibration damper of each head restraint structure can be tuned to the particular resonant frequency without substantially requiring a redesign of the truss and armature structures. This can be accomplished by changing the masses of the metallic resonators and/or changing the spring constants of the polymeric dampers.

Figure 5:
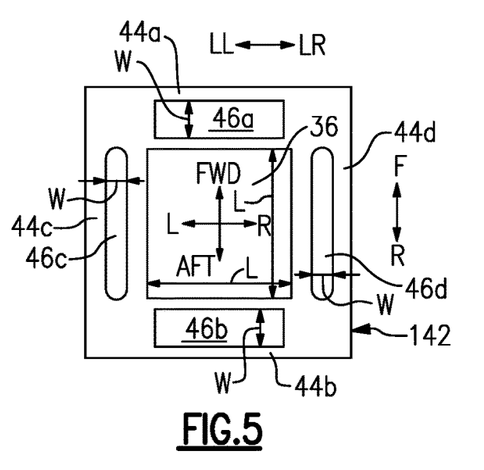
FIG. 5 illustrates a damper (liner) that has elongated cavities.

In the following examples, "F" and "R" represent the vehicle forward and rearward directions, respectively, and "LL" and "LR" represent the lateral left and right directions, respectively. FIG. 5 illustrates a damper 142 that defines damper walls 44a/44b/44c/44d (i.e., forward, rearward, left, and right walls). The walls 44a/44b/44c/44d each have a respective elongated cavity 46a/46b/46c/46d. In this example, the cavities 46a/46b are elongated in the lateral direction and the cavities 46c/46d are elongated in the forward/rearward direction. All of the cavities 46a/46b/46c/46d are also elongated in a height direction, which is approximately orthogonal to the forward/rearward/lateral directions, and are of uniform cross-section throughout their height. Each cavity 46a/46b/46c/46d also defines a width dimension, w. The width dimensions of each of the cavities 46a/46b is greater than the width dimensions of the cavities 46c/46d. Thus, for example, the volumes of the cavities 46a/46d of the respective adjacent damper walls 44a/44d are unequal (likewise for walls 44b/44c). As a result of the greater width dimensions, the spring constant of the damper 142 in the forward/rearward direction is less than the spring constant in the lateral direction. In further examples, the sizes of the cavities 46a/46b/46c/46d may be modified in order to modify the spring constants. In this regard, the dampers herein may be directionally tuned for different resonant frequencies in the forward/rearward direction and the lateral direction.

Figure 6:
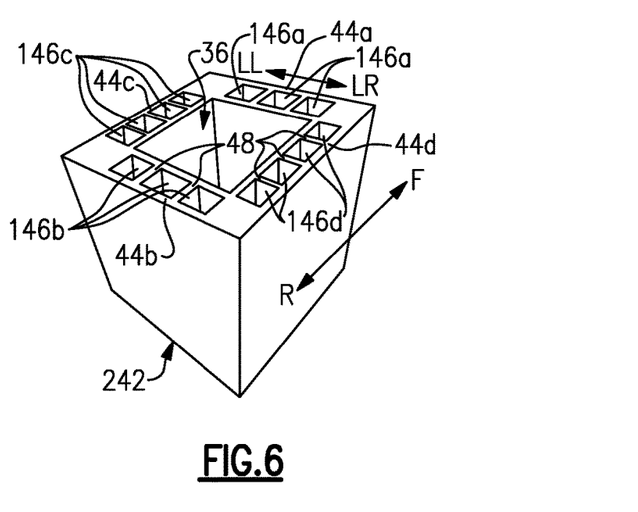
FIG. 6 illustrates a damper (liner) that has cavities and ribs.

FIG. 6 illustrates a damper 242 that also has elongated cavities 146a/146b/146c/146d. In this example, damper walls 44a/44b/44c/44d have respective groups of cavities 146a/146b/146c/146d that are elongated in only the height direction and are of uniform cross-section throughout their height. Within each group of cavities 146a/146b/146c/146d, the cavities are divided by ribs 48. The groups 146a and 146b each have three cavities and the groups 146c and 146d each have four cavities. Thus, the respective adjacent damper walls 44a/44d have unequal numbers of cavities (likewise for walls 44b/44c). As a result, the spring constant of the damper 242 in the forward/rearward direction is greater than the spring constant in the lateral direction. In further examples, the sizes of the cavities 146a/146b/146c/146d and ribs 48 may be modified in order to modify the spring constants.

Figure 7:
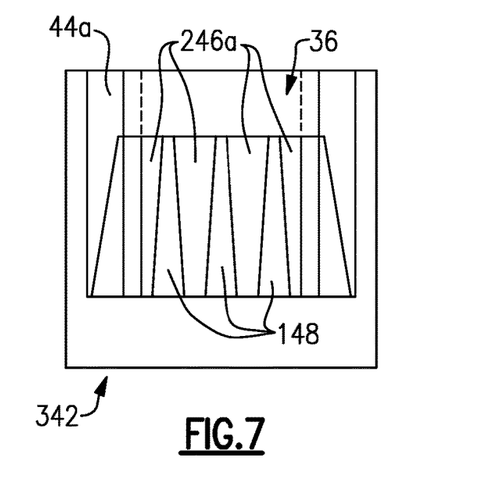
FIG. 7 illustrates a damper (liner) that has tapered ribs.

FIG. 7 illustrates a damper 342 that also has a group of elongated cavities 246a. Here, only the forward damper wall 44a is shown, although it is to be understood that the other damper walls are of the same or similar configuration. In this example, the cavities 246a are divided by tapered ribs 148. Thus, the cavities 246a taper from the top of the damper 342 toward the bottom of the damper 342. As a result, the spring constant of the damper wall 44a progressively changes from top to bottom. For instance, the top portion has a relatively low spring constant that gradually increases toward the bottom. In further examples, the sizes of and numbers of the cavities 246a and ribs 148 may be modified in order to modify the spring constants.

Figure 8:
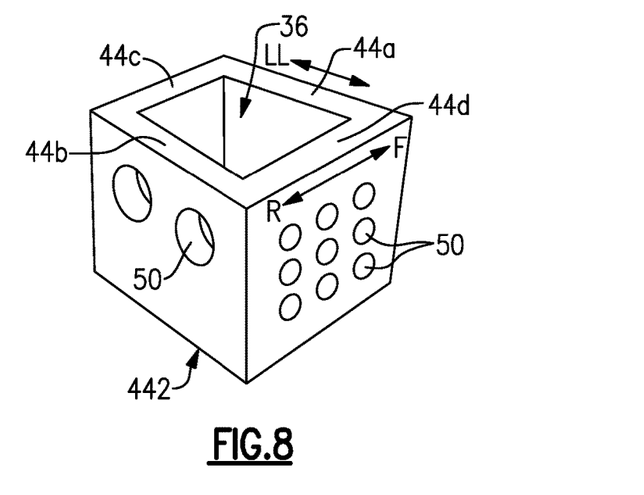
FIG. 8 illustrates a damper (liner) that has through-holes.

FIG. 8 illustrates another damper 442 that, instead of cavities, includes through-holes 50. For instance, the damper wall 44d has through-holes 50 that are of different size and number than the through-holes 50 in the adjacent rearward damper wall 44b. As a result, the spring constant of the damper 442 in the forward/rearward direction is less than the spring constant in the lateral direction. In further examples, the sizes and numbers of the through-holes 50 may be modified in order to modify the spring constants.

Figure 9:
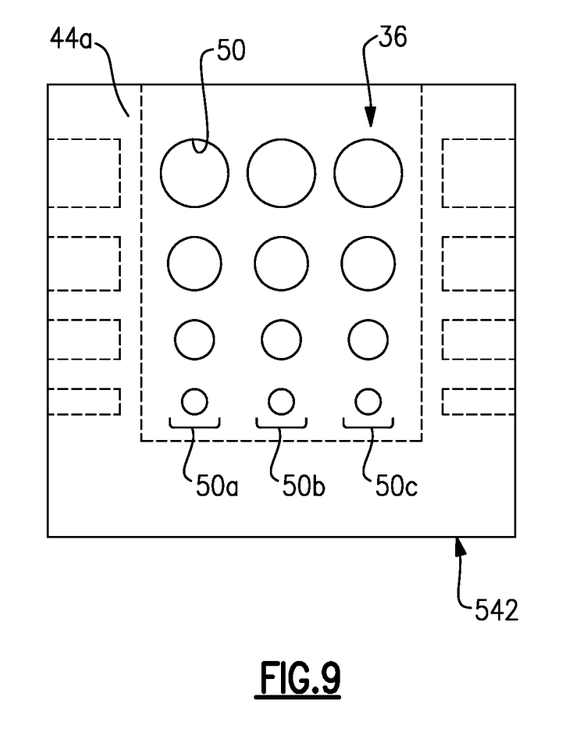
FIG. 9 illustrates a damper (liner) that has columns of through-holes that decrease in size.

FIG. 9 illustrates a further variation in which the through-holes 50 are arranged in respective columns 50a/50b/50c. Here, only the forward damper wall 44a is shown, although it is to be understood that the other damper walls are of the same or similar configuration. In each column, the through-holes 50 progressively decrease in size from the top of the damper 542 toward the bottom of the damper 542. As a result, the spring constant of the damper wall 44a progressively changes from top to bottom. For instance, the top portion has a relatively low spring constant that gradually increases toward the bottom. In further examples, the sizes and numbers of the through-holes 50 may be modified in order to modify the spring constants.

In further examples, the head restraint structure 126 has multiple receptacles 36 and resonators 40. Each receptacle 36 has a damper (e.g., 42/142/242/342/442/542), and each combination of receptacle, resonator 40 and damper is tuned to a unique vibration frequency in the forward/rearward direction and the lateral direction. For instance, one combination is tuned to the resonant frequency of the seat, a second combination is tuned to a frequency that is higher than the resonant frequency of the seat, and a third combination is tuned to a frequency that is lower than the resonant frequency of the seat.

Figure 10:
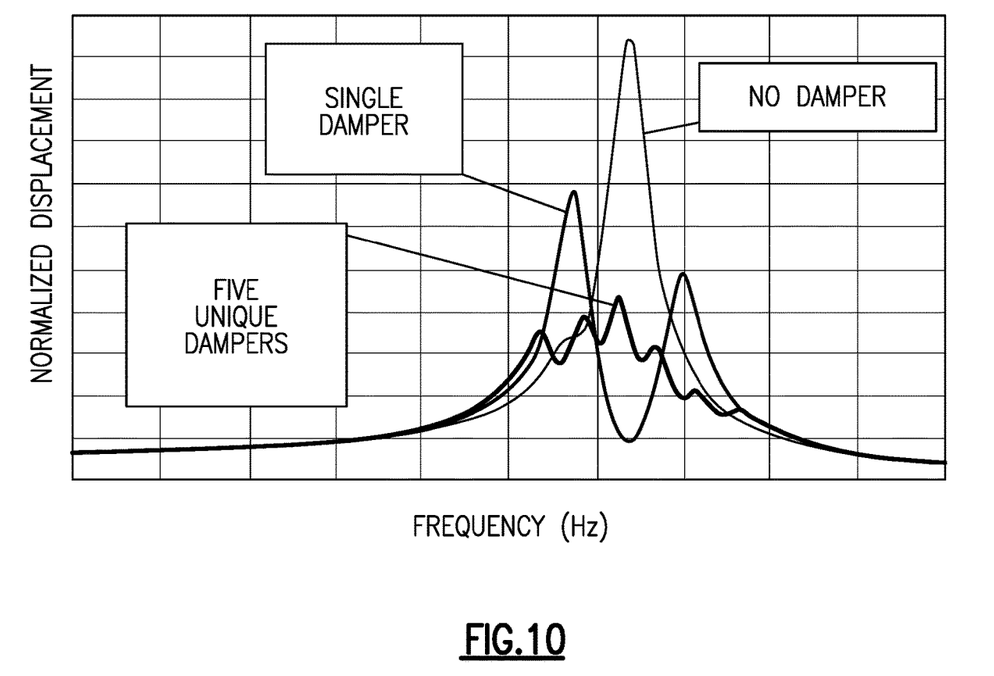
FIG. 10 illustrates a displacement vs. frequency graph.

Tuning the combinations to unique frequencies facilitates enhanced mitigation of the intensified vibrational response of the seat 20. As an example, as shown in the displacement vs. frequency graph in FIG. 10, there are plots for "no damper," single damper," and "five unique dampers." The "no damper" plot has a peak, which represents the resonant frequency of the seat. The "single damper" that is tuned to the resonant frequency mitigates the peak, resulting in two smaller peaks. The "five unique dampers" further mitigates the intensity into numerous even smaller peaks. Such unique frequency tuning can be done for both the forward/rearward direction and the lateral direction.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
a one-piece vehicle head restraint structure defining a frame and a plurality of receptacles;
a plurality of metallic resonators, each said metallic resonator being disposed in one of the receptacles; and
a plurality of polymeric dampers, each said polymeric damper lining one of the receptacles and circumscribing one of the metallic resonators, the polymeric dampers defining damper walls having a plurality of elongated cavities therein.

2. The article as recited in claim 1, wherein the plurality of receptacles includes at least first and second receptacles, and the first and second receptacles share a common receptacle wall.

3. The article as recited in claim 1, wherein adjacent ones of the damper walls each have the elongated cavities, and the adjacent ones of the damper walls have unequal numbers of the elongated cavities.

4. The article as recited in claim 1, wherein adjacent ones of the damper walls each have the elongated cavities, and the elongated cavities are of unequal volumes.

5. The article as recited in claim 1, wherein the elongated cavities are of uniform cross-sectional areas.

6. The article as recited in claim 1, wherein the elongated cavities taper.

7. The article as recited in claim 1, wherein the polymer dampers are formed of rubber, and the metallic resonators are metallic blocks.

8. The article as recited in claim 1, wherein a damping response of the polymer dampers and the metallic resonators is tuned to a resonant vibrational frequency of a vehicle seat.

9. An article comprising:
a headrest including a cushion;
a one-piece vehicle head restraint structure supporting the headrest and defining a frame and a plurality of receptacles;
a plurality of metallic resonators, each said metallic resonator being disposed in one of the receptacles; and
a plurality of polymeric dampers, each said polymeric damper lining one of the receptacles and circumscribing one of the metallic resonators, wherein
the polymer dampers are formed of rubber, the metallic resonators are metallic blocks, and a damping response of the polymer dampers and the metallic resonators is tuned to a resonant vibrational frequency of a vehicle seat, and
the plurality of receptacles includes at least first and second receptacles, the first and second receptacles share a common receptacle wall, and the polymeric dampers define damper walls having at least one of a plurality of elongated cavities therein or a plurality of through-holes therein.

10. The article as recited in claim 9, wherein adjacent ones of the damper walls each have the elongated cavities, and the adjacent ones of the damper walls have unequal numbers of the elongated cavities or the elongated cavities are of unequal volumes.

11. The article as recited in claim 9, wherein adjacent ones of the damper walls each have the through-holes, and the adjacent ones of the damper walls have either unequal numbers of the through-holes or the through-holes are of unequal sizes.

12. The article as recited in claim 1, wherein
the frame includes first and second ribbed trusses connected by a cross-beam and at least two elongated armatures extending from the first and second ribbed trusses, the plurality of receptacles extending off of the cross-beam between the first and second ribbed trusses.

13. The article as recited in claim 12, wherein the one-piece vehicle head restraint structure is formed of a polymeric material, and each said receptacle is defined by receptacle side walls, a receptacle bottom wall, and an open top.

14. The article as recited in claim 1, further comprising a headrest including a cushion, the one-piece vehicle head restraint structure supporting the headrest.

15. The article as recited in claim 1, wherein the one-piece vehicle head restraint structure includes first and second ribbed trusses that are connected by a cross-beam and at least two elongated armatures extending from the ribbed trusses, the plurality of receptacles extending off of the cross-beam between the ribbed trusses.

16. The article as recited in claim 1, wherein each of the receptacles is defined by receptacle side walls, a receptacle bottom wall, and an open top.

17. The article as recited in claim 16, wherein adjacent ones of the damper walls each have the elongated cavities, and the adjacent ones of the damper walls have unequal numbers of the elongated cavities.

18. The article as recited in claim 16, wherein adjacent ones of the damper walls each have the elongated cavities, and the elongated cavities are of unequal volumes.

* * * * *

UNITED STATES PATENT AND TRADEMARK OFFICE
CERTIFICATE OF CORRECTION

| | |
|---|---|
| PATENT NO. | : 11,440,453 B2 |
| APPLICATION NO. | : 17/074913 |
| DATED | : September 13, 2022 |
| INVENTOR(S) | : Sangram Tamhankar et al. |

It is certified that error appears in the above-identified patent and that said Letters Patent is hereby corrected as shown below:

In the Claims

In Column 7, Line 1; replace "polymer" with --polymeric--

In Column 7, Line 5; replace "polymer" with --polymeric--

In Column 7, Line 17; replace "polymer" with --polymeric--

In Column 7, Line 19; replace "polymer" with --polymeric--

Signed and Sealed this
Twentieth Day of December, 2022

*Katherine Kelly Vidal*

Katherine Kelly Vidal
*Director of the United States Patent and Trademark Office*